United States Patent
Erlingsson et al.

(10) Patent No.: US 11,897,703 B2
(45) Date of Patent: Feb. 13, 2024

(54) CONVEYOR SYSTEM AND METHOD

(71) Applicant: VALKA EHF, Kópavogur (IS)

(72) Inventors: Hilmar Erlingsson, Kópavogur (IS); Úlfar Arnórsson, Kópavogur (IS); Ívar Meyvantsson, Kópavogur (IS); Helgi Hjálmarsson, Kópavogur (IS)

(73) Assignee: VALKA EHF, Kópavogur (IS)

( * ) Notice: Subject to any disclaimer, the term of this patent is extended or adjusted under 35 U.S.C. 154(b) by 48 days.

(21) Appl. No.: 17/609,280

(22) PCT Filed: May 7, 2020

(86) PCT No.: PCT/EP2020/062716
§ 371 (c)(1),
(2) Date: Nov. 5, 2021

(87) PCT Pub. No.: WO2020/225364
PCT Pub. Date: Nov. 12, 2020

(65) Prior Publication Data
US 2022/0250856 A1 Aug. 11, 2022

(30) Foreign Application Priority Data

May 7, 2019 (GB) ..................................... 1906418

(51) Int. Cl.
*B65G 47/52* (2006.01)
*B65G 39/07* (2006.01)
(Continued)

(52) U.S. Cl.
CPC .......... *B65G 47/525* (2013.01); *B65G 39/07* (2013.01); *B65G 47/66* (2013.01); *B65G 51/02* (2013.01)

(58) Field of Classification Search
None
See application file for complete search history.

(56) References Cited

U.S. PATENT DOCUMENTS

| 512,182 A | 1/1894 | Scheurer |
| 1,496,376 A | 6/1924 | Perley |

(Continued)

FOREIGN PATENT DOCUMENTS

| CN | 101498601 B | 4/2011 |
| DE | 3302718 A1 | 9/1983 |

(Continued)

OTHER PUBLICATIONS

Certified priority document of International Patent Application No. PCT/IS2006/000008 internationally filed Apr. 4, 2006, 12 pages.

(Continued)

*Primary Examiner* — Kavel Singh
(74) *Attorney, Agent, or Firm* — MORRISON & FOERSTER LLP

(57) ABSTRACT

A conveyor system, comprising a first conveyor assembly having: an input end; an output end; and a conveyor belt arranged to convey an object from the input end toward the output end in a direction of travel. The conveyor system comprises a fluid projection mechanism, the fluid projection mechanism being arranged to provide a fluid suitable for providing a lifting force to a conveyed object as the conveyed object passes over the fluid projection mechanism.

22 Claims, 10 Drawing Sheets

(51) Int. Cl.
 *B65G 47/66* (2006.01)
 *B65G 51/02* (2006.01)

(56) References Cited

U.S. PATENT DOCUMENTS

| | | | |
|---|---|---|---|
| 1,706,734 A | 3/1929 | Hughes | |
| 2,168,419 A | 8/1939 | Paterson | |
| 2,377,123 A * | 5/1945 | Ballamy | B65G 47/525 |
| | | | 19/161.1 |
| 3,319,766 A | 5/1967 | Crosby et al. | |
| 3,561,552 A | 2/1971 | Rischke | |
| 3,656,617 A | 4/1972 | De Bie | |
| 3,756,374 A | 9/1973 | Burt et al. | |
| 3,872,695 A | 3/1975 | Busek | |
| 4,008,888 A | 2/1977 | Vinciguerra | |
| 4,106,174 A | 8/1978 | Ilines | |
| 4,122,941 A | 10/1978 | Giles et al. | |
| 4,308,928 A | 1/1982 | Oshima et al. | |
| 4,310,276 A | 1/1982 | Castagnoli | |
| 4,344,493 A | 8/1982 | Salmonsen et al. | |
| 4,358,009 A | 11/1982 | Rysti | |
| 4,381,582 A | 5/1983 | Korhonen | |
| 4,398,612 A | 8/1983 | Mikami et al. | |
| 4,421,185 A | 12/1983 | Koto et al. | |
| 4,428,179 A | 1/1984 | Jordan et al. | |
| 4,442,910 A | 4/1984 | Mikami | |
| 4,483,047 A | 11/1984 | Linville, Jr. | |
| 4,557,019 A | 12/1985 | Van Devanter et al. | |
| 4,561,510 A | 12/1985 | Sugioka et al. | |
| 4,564,103 A | 1/1986 | Sashiki et al. | |
| 4,570,831 A | 2/1986 | Izumi et al. | |
| 4,600,096 A | 7/1986 | Yamano et al. | |
| 4,603,768 A | 8/1986 | Deutschle | |
| 4,615,403 A | 10/1986 | Nakamura | |
| 4,619,359 A | 10/1986 | Kennedy, Jr. et al. | |
| 4,632,254 A | 12/1986 | Scopatz | |
| 4,662,508 A | 5/1987 | Inoue et al. | |
| 4,681,176 A | 7/1987 | Moran et al. | |
| 4,708,215 A | 11/1987 | Nakamura et al. | |
| 4,720,961 A | 1/1988 | Jordan | |
| 4,748,724 A | 6/1988 | Lapeyre et al. | |
| 4,758,778 A | 7/1988 | Kristinsson | |
| 4,765,488 A | 8/1988 | Moriarity | |
| 4,821,820 A | 4/1989 | Edwards et al. | |
| 4,843,561 A | 6/1989 | Larson | |
| 4,870,799 A | 10/1989 | Bergerioux et al. | |
| 4,874,049 A | 10/1989 | Kee et al. | |
| 4,911,281 A | 3/1990 | Jenkner | |
| 4,962,568 A | 10/1990 | Rudy et al. | |
| 4,963,251 A | 10/1990 | Bohm et al. | |
| 4,970,757 A | 11/1990 | Heiland et al. | |
| 5,054,831 A | 10/1991 | Ting et al. | |
| 5,162,016 A | 11/1992 | Malloy | |
| 5,205,779 A | 4/1993 | O'Brien et al. | |
| 5,247,761 A | 9/1993 | Miles et al. | |
| 5,318,173 A | 6/1994 | Datari | |
| 5,340,949 A | 8/1994 | Fujimura et al. | |
| 5,403,056 A | 4/1995 | Wallace | |
| 5,429,223 A | 7/1995 | Moeller | |
| 5,501,313 A | 3/1996 | Bonnet | |
| 5,613,595 A | 3/1997 | Ukada | |
| 5,626,236 A | 5/1997 | Hiebert | |
| 5,699,896 A | 12/1997 | Spada et al. | |
| 5,813,195 A | 9/1998 | Nielsen et al. | |
| 5,842,306 A | 12/1998 | Onosaka et al. | |
| 5,957,306 A | 9/1999 | Hoffman | |
| 5,998,740 A | 12/1999 | Kvisgaard et al. | |
| 6,002,125 A | 12/1999 | Schubert | |
| 6,015,049 A | 1/2000 | Heikes | |
| 6,122,895 A | 9/2000 | Schubert | |
| 6,124,560 A | 9/2000 | Roos et al. | |
| 6,126,017 A | 10/2000 | Hours | |
| 6,234,300 B1 | 5/2001 | De Vos et al. | |
| 6,321,135 B1 | 11/2001 | Asgeirsson | |
| 6,388,209 B1 | 5/2002 | Gudmundsson | |
| 6,407,346 B1 | 6/2002 | Baker | |
| 6,437,256 B1 | 8/2002 | Miyamoto | |
| 6,444,926 B1 | 9/2002 | Ricciardi, Sr. | |
| 6,493,605 B1 | 12/2002 | Prideaux et al. | |
| 6,640,158 B1 | 10/2003 | Brandt, Jr. | |
| 6,787,712 B2 | 9/2004 | Asai et al. | |
| 6,955,031 B2 | 10/2005 | Doake et al. | |
| 7,057,118 B2 | 6/2006 | Arnason et al. | |
| 7,080,739 B2 | 7/2006 | Guy et al. | |
| 7,240,465 B2 | 7/2007 | Davi'et al. | |
| 7,252,584 B2 | 8/2007 | Kragh | |
| 7,258,237 B2 | 8/2007 | Nielsen | |
| 7,323,643 B2 | 1/2008 | Hjalmarsson | |
| 7,368,670 B2 | 5/2008 | Hjalmarsson | |
| 7,395,934 B2 | 7/2008 | Gudjonsson | |
| 7,452,266 B2 | 11/2008 | Bottemiller | |
| 7,715,935 B2 | 5/2010 | Vogeley, Jr. et al. | |
| 7,904,198 B2 | 3/2011 | Hawes | |
| 7,967,149 B2 | 6/2011 | Helgi | |
| 8,158,895 B2 | 4/2012 | Grundtvig et al. | |
| 8,662,314 B2 | 3/2014 | Jones et al. | |
| 9,079,223 B2 | 7/2015 | Bjornsson et al. | |
| 9,095,147 B2 | 8/2015 | Hjalmarsson et al. | |
| 11,259,531 B2 | 3/2022 | Hjalmarsson et al. | |
| 11,344,036 B2 | 5/2022 | Hjalmarsson et al. | |
| 11,357,237 B2 | 6/2022 | Hjalmarsson et al. | |
| 2002/0067797 A1 | 6/2002 | Safai et al. | |
| 2002/0071038 A1 | 6/2002 | Mihelcic | |
| 2003/0052049 A1 | 3/2003 | Franci | |
| 2004/0022930 A1 | 2/2004 | Skjervold et al. | |
| 2004/0231480 A1 | 11/2004 | Wattles et al. | |
| 2005/0032471 A1 | 2/2005 | Pfarr et al. | |
| 2005/0085176 A1 | 4/2005 | Houtz | |
| 2005/0137744 A1 | 6/2005 | Winkelmolen et al. | |
| 2005/0147325 A1 | 7/2005 | Chen et al. | |
| 2006/0161380 A1 | 7/2006 | Bottemiller | |
| 2006/0162515 A1 | 7/2006 | Vogeley et al. | |
| 2006/0182603 A1 | 8/2006 | Hawes | |
| 2007/0039763 A1 | 2/2007 | Hjalmarsson | |
| 2007/0144792 A1 | 6/2007 | Hjalmarsson | |
| 2007/0290516 A1 | 12/2007 | Buljo | |
| 2009/0026119 A1 | 1/2009 | Helgi | |
| 2009/0057098 A1 | 3/2009 | Helgi | |
| 2009/0145670 A1 | 6/2009 | Grundtvig et al. | |
| 2009/0170417 A1 | 7/2009 | Janssen et al. | |
| 2009/0216368 A1 | 8/2009 | Thorsson | |
| 2009/0238670 A1 | 9/2009 | Helgi et al. | |
| 2009/0301940 A1 | 12/2009 | Elvarsson et al. | |
| 2010/0101191 A1 | 4/2010 | Lindee | |
| 2012/0150339 A1 | 6/2012 | Bjornsson et al. | |
| 2012/0307013 A1 | 12/2012 | Hjalmarsson et al. | |
| 2013/0187398 A1 | 7/2013 | Cho | |
| 2017/0028429 A1 | 2/2017 | Linares | |
| 2018/0009105 A1 | 1/2018 | Kutsukake et al. | |
| 2018/0065135 A1 | 3/2018 | Linares | |
| 2019/0000094 A1 | 1/2019 | Hjalmarsson et al. | |
| 2019/0337167 A1 | 11/2019 | Clifford et al. | |
| 2020/0077670 A1 | 3/2020 | Hjalmarsson et al. | |
| 2020/0288731 A1 | 9/2020 | Hjalmarsson et al. | |
| 2022/0061340 A1 | 3/2022 | Hjalmarsson et al. | |
| 2022/0256869 A1 | 8/2022 | Hjalmarsson et al. | |

FOREIGN PATENT DOCUMENTS

| | | |
|---|---|---|
| DE | 4413967 A | 11/1994 |
| DE | 69104122 T2 | 3/1995 |
| DE | 20203818 U1 | 5/2002 |
| DE | 202004001567 U1 | 2/2005 |
| DE | 102004056031 A1 | 5/2006 |
| DE | 102006061571 A1 | 7/2008 |
| DE | 202011110569 U1 | 10/2014 |
| EP | 734653 A | 10/1996 |
| EP | 761322 A1 | 3/1997 |
| EP | 1074822 A2 | 2/2001 |
| EP | 1687599 B1 | 4/2007 |
| EP | 1819994 B1 | 10/2008 |
| EP | 1896196 B1 | 12/2010 |
| EP | 3178571 A1 | 6/2017 |
| FR | 2454338 A1 | 11/1980 |

(56) References Cited

FOREIGN PATENT DOCUMENTS

| | | |
|---|---|---|
| FR | 2595589 A1 | 9/1987 |
| FR | 2744984 A1 | 8/1997 |
| FR | 2754239 A1 | 4/1998 |
| GB | 242848 A | 11/1925 |
| GB | 483949 A | 4/1938 |
| GB | 2116732 B | 2/1986 |
| GB | 2405081 A | 2/2005 |
| GB | 2415944 A | 1/2006 |
| JP | S6031421 A | 2/1985 |
| JP | S62249818 A | 10/1987 |
| JP | H07256582 A | 10/1995 |
| JP | H0882546 A | 3/1996 |
| JP | H09224935 A | 2/1997 |
| WO | WO-1989008983 A1 | 10/1989 |
| WO | WO-1993016849 A1 | 9/1993 |
| WO | WO-1995035238 A1 | 12/1995 |
| WO | WO-1996008322 A1 | 3/1996 |
| WO | WO-1999044759 A1 | 9/1999 |
| WO | WO-2000022934 A1 | 4/2000 |
| WO | WO-2000023771 A1 | 4/2000 |
| WO | WO-2000023772 A1 | 4/2000 |
| WO | WO-2001007324 A1 | 2/2001 |
| WO | WO-2001010574 A1 | 2/2001 |
| WO | WO-2001022043 A2 | 3/2001 |
| WO | WO-2001027567 A2 | 4/2001 |
| WO | WO-2002043502 A2 | 6/2002 |
| WO | WO-2003008917 A1 | 1/2003 |
| WO | WO-2003069285 A2 | 8/2003 |
| WO | WO-2004090481 A1 | 10/2004 |
| WO | WO-2005051812 A1 | 6/2005 |
| WO | WO-2005062994 A2 | 7/2005 |
| WO | WO-2005085776 A1 | 9/2005 |
| WO | WO-2005095904 A1 | 10/2005 |
| WO | WO-2005102620 A1 | 11/2005 |
| WO | WO-2006064521 A1 | 6/2006 |
| WO | WO-2006092311 A1 | 9/2006 |
| WO | WO-2006106532 A1 | 10/2006 |
| WO | WO-2007022782 A2 | 3/2007 |
| WO | WO-2007083327 A2 | 7/2007 |
| WO | WO-2007134603 A1 | 11/2007 |
| WO | WO-2008095500 A2 | 8/2008 |
| WO | WO-2016139611 A2 | 9/2016 |
| WO | WO-2019058262 A1 | 3/2019 |
| WO | WO-2020053310 A1 | 3/2020 |
| WO | WO-2020225364 A1 | 11/2020 |

OTHER PUBLICATIONS

Extended European Search Report for European Patent Application No. EP 1000150.9, completed on Jul. 28, 2010, 7 pages.
International Preliminary Report on Patentability for International Application No. PCT/IB2016/051192, dated Sep. 14, 2017, 11 pages.
International Search Report and Written Opinion for International application No. PCT/EP2019/074281 filed Feb. 17, 2020, 9 pages.
International Search Report and Written Opinion for International Application No. PCT/EP2020/062716, dated Jul. 21, 2020, 10 pages.
International Search Report and Written Opinion for International Application No. PCT/IB2016/051192, dated Sep. 12, 2016, 16 pages.
International Search Report and Written Opinion for International Application No. PCT/IB2018/057196, dated Jan. 7, 2019, 11 pages.
International Search Report and Written Opinion for International Application No. PCT/IS2004/000014, dated Nov. 18, 20004, 8 pages.
International Search Report and Written Opinion for International Application No. PCT/IS2005/000006, dated Jun. 15, 2005, 8 pages.
International Search Report and Written Opinion for International Application No. PCT/IS2007/000003, dated Sep. 11, 2007, 12 pages.
International Search Report and Written Opinion for International Application No. PCT/IS2007/000004, dated Sep. 13, 2007, 13 pages.
International Search Report and Written Opinion for International Application No. PCT/IS2007/000013, dated Nov. 30, 2007, 10 pages.
International Search Report for International Application No. PCT/IB2010/002109, dated Nov. 30, 2010, 4 pages.
International Search Report for PCT/IS2011/000001, Completed by the European Patent Office dated Jun. 27, 2011, 2 Pages.
U.S. Unpublished U.S. Appl. No. 17/275,599, filed Mar. 11, 2021 titled "Apparatus for Processing and Grading Food Articles and Related Methods," (Copy not submitted herewith pursuant to the waiver of 37 C.F.R. § 1.98(a)(2)(iii)).
U.S. Unpublished U.S. Appl. No. 17/578,355, filed Jan. 18, 2022 titled "Apparatus for Processing and Grading Food Articles and Related Methods," (Copy not submitted herewith pursuant to the waiver of 37 C.F.R. § 1.98(a)(2)(iii)).

\* cited by examiner

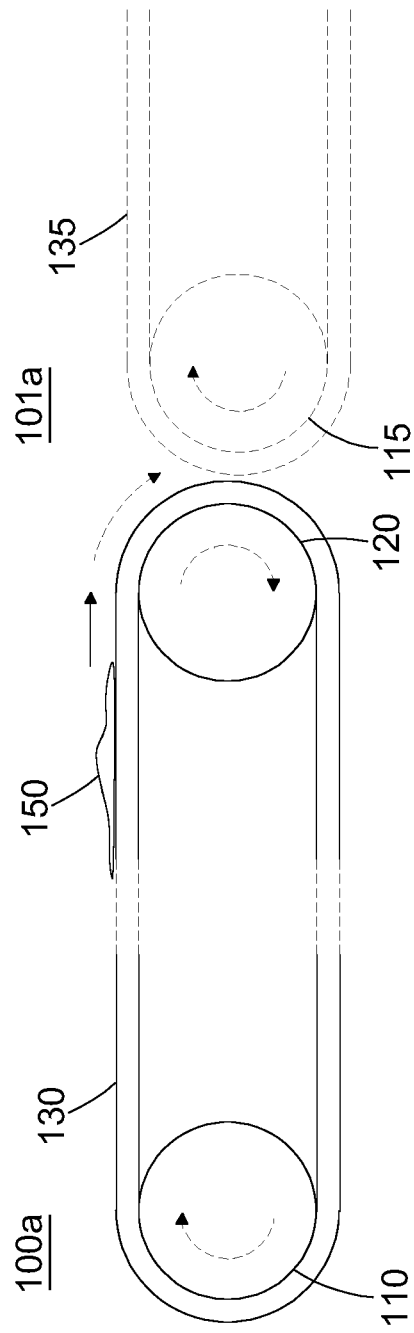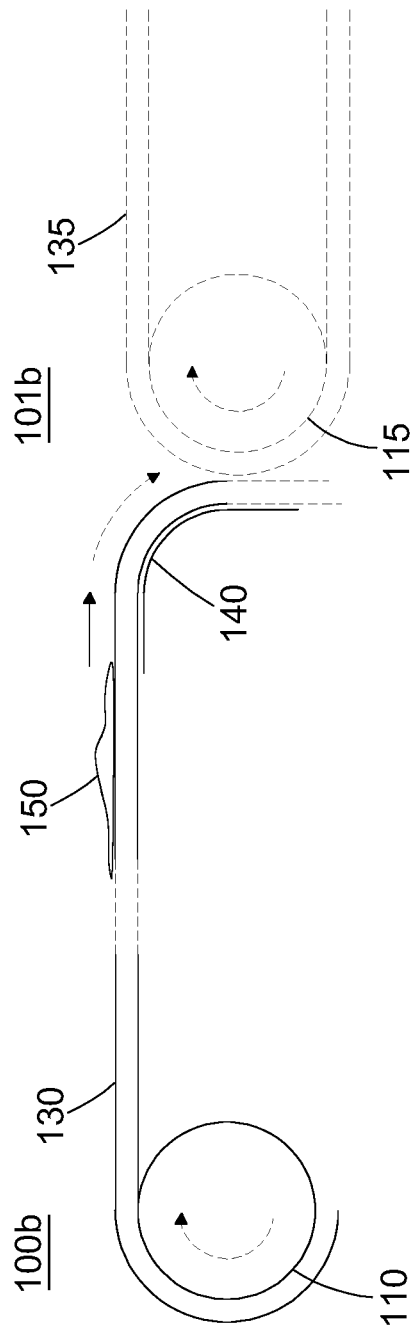
Fig.1a
Fig.1b

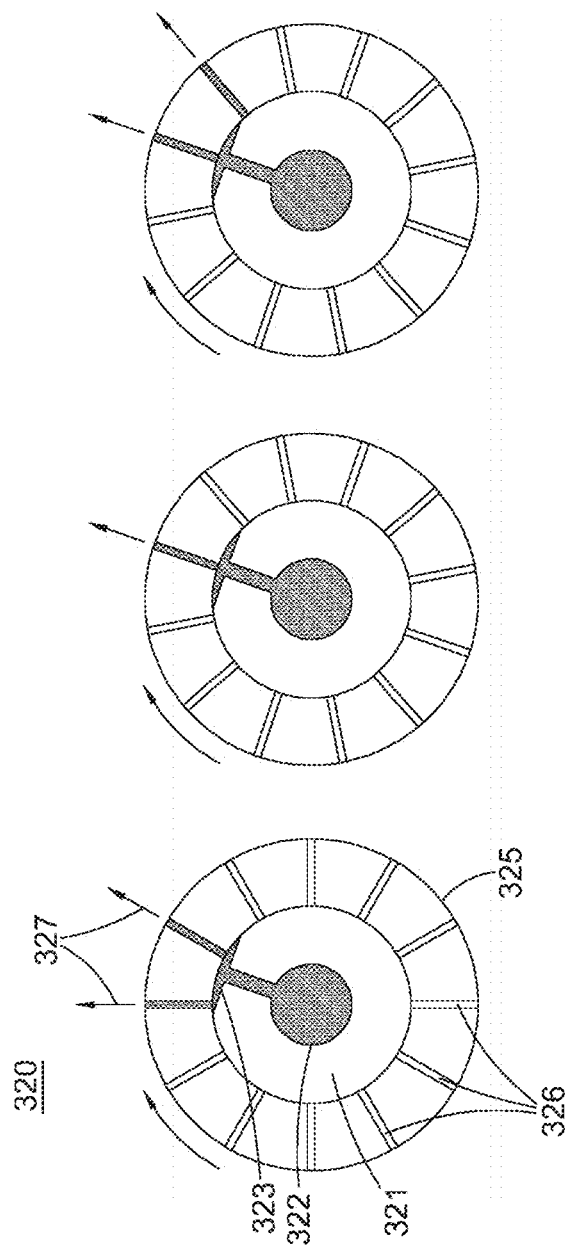

CONVEYOR SYSTEM AND METHOD

CROSS REFERENCE TO RELATED APPLICATIONS

This application is a national stage application under 35 U.S.C. § 371 of International Application No. PCT/EP2020/062716, filed internationally on May 7, 2020, which claims the benefit of GB 1906418.7, filed on May 7, 2019.

FIELD

The present disclosure relates generally to a method and apparatus for conveying items on a conveyor.

BACKGROUND

Belt conveyor systems are widely used to enable industrial automation. Conveyor systems are frequently composed of multiple conveyor units, at or upon which different operations may be performed on the items, each unit with a continuous belt and motor. A challenge encountered in transporting deformable items (e.g. articles of food) on such conveyor systems is transferring the items from a conveyor belt to another element in the system without damaging the items.

In addition to gravity, food items may adhere to conveyor belts. For example, when portioning food items conveyed on a porous belt using a water jet ligaments or other thin components can become lodged in the openings of a porous conveyor belt. This makes it more challenging to transfer objects from a cutting conveyor to a receiving conveyor.

OVERVIEW OF THE PRESENT DISCLOSURE

The current disclosure provides a method and apparatus for facilitating transfer of an item to or from a conveyor assembly; for example, for transferring an item from an output end of a conveyor belt to a receiving location.

There is provided a conveyor system, comprising: a first conveyor assembly having: an input end; an output end, and a conveyor belt arranged to convey an object from the input end towards the output end in a direction of travel, wherein the conveyor system comprises a fluid projection mechanism, the fluid jet being arranged to provide a fluid suitable for providing a lifting force to a conveyed object as the conveyed object passes over the fluid projection mechanism.

The input end may be any location of the conveyor assembly at which the object is placed on the conveyor belt, either at the start of the conveyor belt or part way along the conveyor belt in the direction of travel. Similarly, the output end of the conveyor assembly may be at the end of the conveyor belt or part way along the conveyor belt, or wherever the conveyor assembly is configured to direct the object off the conveyor belt. The output "end" of the conveyor belt as described herein may be the point after which the belt makes a substantial change of direction such that an object being conveyed in a direction of travel may be conveyed no further by the belt in that direction. Essentially the belt reverses course back to the beginning of the conveyor assembly.

The fluid projection mechanism may comprise one or more fluid jets, which may preferably be provided at an output end of the conveyor assembly. In general, at the output end of a conveyor assembly, the belt will pass over some kind of roller or lip, and as the belt passes over the roller, the belt will change its trajectory away from the direction of travel of the general direction of travel if the conveying side of the belt. An item resting on the belt and moving in the direction of travel will therefore follow this change of direction (downwards) before being "picked up" by a receiving belt. This change of direction in transfer means that forces are applied to the item, which can be undesirable when the items being conveyed are fragile, as is often the case with food items, for example. The solution provided is to provide a lift force to the item as it passes over a gap between the output end of a conveyor assembly and the receiving assembly. The lifting force is provided to counteract the force of gravity acting on the object so as to maintain a trajectory close or equal to that of the direction of travel of the object on the conveyor belt. The lifting force may be provided to an underside of the item on the conveyor as it reaches the end of the conveyor assembly, to provide an effective bridging means from the end of the conveyor assembly. One or more streams of fluid are introduced, that lift the item as the item approaches the end of the conveyor assembly where a gap might be present, and thus can prevent the item getting trapped, damaged or lost.

The jets may optionally provide one or more fluid streams at other points of the conveyor assembly in addition to or instead of having a fluid projection mechanism at the output end of the conveyor assembly. If it is desirable to transfer a product from an intermediate portion of a conveyor belt, the fluid jets may provide fluid streams arranged to provide a lifting force to a conveyed item at the intermediate portion. Alternatively, it may be desired to transfer an item onto the input end or intermediate portion of a conveyor belt.

The conveyor belt may have any structure or properties that allows the belt to travel in a cycle to convey objects placed on the conveyor belt from the input end to the output end. For example, the conveyor belt may be a continuous material or may be formed of modular sections linked together as a chain.

The fluid projection mechanism ejects fluid at a velocity such that it may provide a force to an object in the path of the ejected fluid. Any matter may be ejected by the fluid projection mechanism, in the form of a liquid, gas, aerosol or mixture of the above. The fluid projection mechanism is any mechanism which can eject, project, propel, or throw fluid and hence alternative terminology such as "fluid ejection mechanism" is equivalent to "fluid projection mechanism" as used throughout the description.

The lifting force provided by the fluid to a conveyed item need not in fact raise the height of the conveyed item, it may simply provide a force counteracting gravity, so as to reduce a contact force with the conveyor belt, or to cushion the landing of an item falling under gravity onto a conveyor belt.

The conveyor system described herein can provide more control to the forces acting upon, and therefore movement of items as they pass through a system from conveyor assembly to conveyor assembly—this means that items will sustain less damage as they move through a conveyor system. Optionally the fluid projection mechanism may be arranged to provide the fluid at an angle between a first angle perpendicular to the direction of travel and a second angle parallel to the direction of travel.

In this way the jets can follow the motion of the conveyed item, or act in the direction of travel.

Optionally, the system further comprises a conveyor roller comprising: a body having a rolling surface between a first end and a second end; a fluid cavity located within the body, and a fluid channel arranged to connect the fluid cavity with the rolling surface, the fluid channel being arranged such that a pressurised fluid in the fluid cavity may pass through the fluid channel to provide a stream of fluid from the rolling surface.

The fluid cavity may be any space in which pressured water can be contained. The cavity could be in communication with an external water source (i.e. the mains) or an external reservoir, e.g. pressurised gas cannister. The fluid cavity may simply be a conduit/pipe for conducting fluid to the channels from somewhere else.

The fluid channel may be a single slit formed in the rolling surface extending in a direction of a longitudinal axis of the conveyor roller, about which the roller rotates. Alternatively, the fluid channel comprises a plurality of fluid channels arranged on the rolling surface to produce a plurality of fluid streams. The location of the fluid channels may be arranged so as to optimise the timing of a fluid stream and force produced by a fluid stream Optionally, the conveyor belt may permeable, such that the fluid can pass from the rolling surface through the conveyor belt. The fluid may pass through the belt and in this way the fluid streams can act to overcome any adhesion or adhesive force that exists between the belt and the item.

Optionally, the conveyor belt comprises a plurality of perforations, and roller comprises a plurality of fluid channels is arranged such that the plurality of fluid channels are configured to align with the perforations such that the a plurality of streams of fluid pass from the rolling surface through the conveyor belt. In this way the roller rotates at the same speed as the belt passes over it such that the perforations move at the same rate as the fluid channels.

Optionally, the roller body comprises an inner axle, and an outer axle, and wherein a plurality of fluid channels are located in the outer axle; the fluid cavity is located in the inner axle, the fluid cavity comprising a fluid cavity outlet located on an outer face of the inner axle, wherein the outer axle may be rotatable about the longitudinal axis with respect to the inner axle such that the plurality of fluid channels cyclically move from a first position in communication with the fluid cavity outlet to a second position not in communication with the fluid cavity outlet.

The inner axle and outer axle can be controlled independently of each other. The provision of multiple channels over the fluid cavity outlet means multiple jets can be controlled from a single pressurised source of fluid. The fluid supply may be provided at an end of the inner axle or roller assembly so as not to interfere with the rolling motion of the roller assembly.

Optionally, the conveyor assembly further comprises a lip assembly, the conveyor belt being arranged to pass over the fixed lip assembly, wherein the fluid projection mechanism is located at the lip assembly, and arranged to provide the fluid as the conveyed object passes over the lip assembly. A lip assembly may be a part of the conveyor assembly over which the conveyor belt passes. In general the conveyor belt will change direction as it passes over a lip, and a lip may form an output point of a conveyor assembly from which a conveyed item is transferred to some other assembly.

Optionally, the lip assembly comprises: a body having a conveying surface, a fluid cavity located within the body, and a fluid channel arranged to connect the fluid cavity with the conveying surface, the fluid channel being arranged such that a pressurised fluid in the fluid cavity may pass through the fluid channel to provide the fluid for providing a lifting force to the conveyed object from the conveying surface.

Optionally, the lip assembly comprises a plurality of fluid channels arranged to provide a plurality of streams of fluid for providing the lifting force to the conveyed object. A plurality of fluid channels can be located on the surface of the lip assembly to provide a force at a pre-determined location.

Optionally, the fluid projection mechanism is located at the output end of the conveyor assembly, and arranged to provide the fluid as the conveyed object passes over the output end. As the conveyor belt passes over the output end the conveyed item will change its direction of motion in accordance with the forces acting on it—including gravity, the motion of the belt and any adhesion between the item and the belt. The fluid projection mechanism is provided at the output end to control the motion of the item as it leaves the belt.

A roller for a conveyor assembly is provided, comprising: a body having a rolling surface between a first end and a second end; a fluid cavity located within the body, a fluid channel arranged to connect the fluid cavity with the rolling surface, the fluid channel being arranged such that pressurised fluid in the fluid cavity may pass through the fluid channel to exit the body through the rolling surface to provide a fluid for directing at a conveyor belt of the conveyor assembly. Such a roller may be retro-fitted to an existing system to provide more control to the movement of conveyed items.

Optionally, the body comprises an inner axle and an outer axle, the fluid channel is located in the outer axle; the fluid cavity is located in the inner axle, and the fluid cavity comprises a fluid cavity outlet located on an outer face of the inner axle, wherein the outer axle is rotatable about the longitudinal axis with respect to the inner axle such that the fluid channel cyclically moves from a first position in communication with the fluid cavity outlet to in a second position not in communication with the fluid cavity outlet. The inner axle may be fixed so it may be mounted and in communication with a fluid line from which it receives fluid. The rotation of the outer axle may be controlled independently of the conveyor belt, or the motion of the outer axle may be determined by the motion of the conveyor belt.

Optionally, the body is cylindrical, the body is arranged to rotate about a longitudinal axis, and the fluid channel is arranged perpendicular to the longitudinal axis.

Optionally, the inner axle is fixed to prevent rotation about the longitudinal axis.

Optionally, the first position occupies an angular range perpendicular to the longitudinal axis between a first angle and second angle, wherein the first angle is perpendicular to a direction of travel of a conveyor belt the roller and the second angle is parallel to the direction of travel of a conveyor belt. This range of angles may provide a lifting force and also a propulsive force in the direction of travel of the item.

A method of conveying an object from a first conveyor assembly is provided, the conveyor assembly having an input end and an output end and comprising a conveyor belt arranged to convey an object in a direction of travel from the input end towards the output end, the method comprising: conveying an object on the conveyor belt; providing a fluid projection mechanism arranged to project a fluid, and directing the fluid to provide a lifting force to the conveyed object as the conveyed object passes over the fluid projection mechanism. Conveying means transporting from one point on the conveyor assembly to another.

Optionally, directing the fluid comprises directing the fluid at an under-side of the object. Optionally, the fluid is directed in a direction upwards against gravity.

Optionally, the output end comprises an output roller, the method further comprises: providing the fluid projection mechanism on the output roller, and providing the lifting force is done so as to lift the object from the conveyor belt as it passes over the roller.

Optionally, the output end comprises a lip assembly, the conveyor belt is arranged to pass over the lip assembly to return to the input end, and the method further comprises: providing the one or more fluid projection mechanisms on the lip assembly, and providing the lifting force is done so as to lift the object from the conveyor belt as it passes over the lip assembly.

Optionally, the method further comprises: providing the fluid projection mechanism in an angular range between a first angle perpendicular to the direction of travel and a second angle in the direction of travel.

Optionally, the fluid comprises one of air; water, and a mixture of air and water. The properties of a fluid stream may be selected depending on the properties of the item being conveyed. Air may provide a more gentle force than water, which may be too abrasive for the most fragile of items. Different fluid stream characteristics may be determined by a nozzle or fluid channel aperture to create different flow types.

BRIEF DESCRIPTION OF THE DRAWINGS

Examples of the present disclosure will now be explained with reference to the accompanying drawings in which:

FIG. 1a shows a simplified cross-sectional diagram of a conveyor assembly;

FIG. 1b shows a simplified cross-sectional diagram of a conveyor assembly;

FIGS. 3a to 3c show a cross-section of a conveyor roller according to the present disclosure;

Throughout the description and the drawings, like reference numerals refer to like parts.

EXAMPLE EMBODIMENTS

Figure 2:
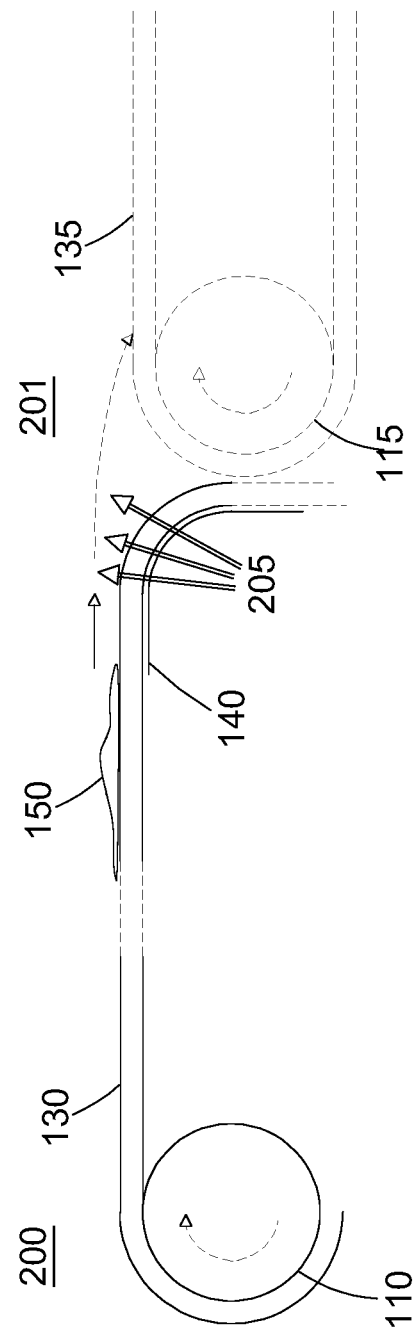
FIG. 2 shows a simplified cross-sectional diagram of a conveyor assembly according to the present disclosure.

FIGS. 1a and 1b show examples of conveyor assemblies 100a and 100b. A conveyor assembly 100a, 100b may comprise an input end and an output end, at the input end an input roller 110 may be located, and at the output end an output roller 120 may be located. Between the rollers is a continuous conveyor belt 130. A continuous conveyor belt 130 is a loop of material which may be rotated without break. The continuous conveyor belt may be constructed of a single piece of material or may be modular in its construction. It can be seen that rotation of the rollers 110, 120 causes the belt 130 to rotate in a direction of travel indicated by the arrows in FIG. 1a. Herein, the term "direction of travel" refers to a direction that is tangential to the upper surface of the conveyor belt as it travels from the input end to the output end.

An item resting on the conveyor belt under the force of gravity will be transported from the input end along the conveyor belt to the output end. In all conceivable conveyor belt systems, at the output end the belt 130, if it is a continuous belt, must undergo a change of direction so as to loop back to the input end. With this change of direction, the surface of the belt changes from parallel to the direction of travel between the input end and the output end.

While an object is being transported on a conveyor assembly 100a specific actions or operations may be performed, and once that operation has been completed the item 150 may be passed to a further conveyor assembly 101a. The further, or receiving assembly 101a may also comprise a continuous belt 135 and an input end roller 115 as shown in FIG. 1. Alternatively, the receiving assembly may be a conveyor system moving in a transverse direction, a movable platform or a stationary surface.

In the variant shown in FIG. 1b, rather than an output roller, an output lip 140 is provided. The belt 130 moves over the lip which serves to change the direction of the belt so that it may loop back in a number of possible ways to the input end.

As can be seen in FIGS. 1a and 1b when using a continuous belt at the output end as the conveyor belt 130 passes over the output roller 120 or the output lip 140, the conveyor belt 130 changes direction. Where a conveyed item 150 is a non-rigid item, as the conveyed item 150 passes over the roller 120 or lip 140 it will be subject to bending forces. This is shown by the dashed arrow in FIGS. 1a and 1b, and it will be appreciated that as the front of the conveyed item 150 passes over the lip, the leading part of the item will follow the path of the belt, under the force of gravity, into the aperture which exists between the output end of the conveyor assembly 100a, 100b and receiving assemblies 101a, 101b.

It will also be appreciated that the surfaces of conveyor belts 130 and 135 shown in FIGS. 1a and 1b are moving in opposite directions at the point of closest approach between conveyor assemblies 100a, 100b and receiving assemblies 101a, 101b. That is to say, belt 130 is moving "down" over the roller/lip and belt 135 is moving "up" over roller This means that a conveyed item which moves under the force of gravity into the cavity between the conveyor assemblies 100a, 100b and receiving assemblies 101a, 101b will be subject to stretching or tension forces which may have damaging effect on the conveyed item 150.

The size of the aperture between a first conveyor assembly 100a and a receiving conveyor assembly 101a might conceivably be minimised through reducing the size of a diameter D of an output roller 120 and an input roller 115 or reducing a radius of curvature of an output removable lip 140. Nonetheless an aperture, recess of simply gap will always exist between a first conveyor assembly and a receiving (conveyor) assembly due to the non-zero thickness of a continuous conveyor belt which is required to undergo a change of direction to loop back to the input end of the conveyor system.

In a conveyor assembly 100, a conveyor roller 110 or 120, may be a driving or a driven pulley. A driving pulley may be used to provide a drive to move a conveyor belt 130. Conveyor assembly may comprise one or more driving pulleys, and the driving pulleys may provide the driving force to the conveyor belt through gearing or belt drive. Driven pulleys may be used to alter a path of the conveyor belt in a vertical direction, if the roller is not placed in the same plane as the input end and output end. Other conveyor rollers may be provided to simply support the conveyor belt between the input and output ends. In general a roller is cylindrical, and rotated about a longitudinal axis of the cylinder. The roller comprises a rolling surface which may be arranged to contact the conveyor belt 130. The rolling surface may move at the same speed as the conveyor belt such that there is no relative motion between the point of the rolling surface that is in contact with the conveyor belt and the conveyor belt.

A conveyor system may comprise any number of conveyor assemblies 100, 101, and where the system comprises many such assemblies, a fragile item to be conveyed between the assemblies may undergo repeated phases in which tension is applied across it, and repeatedly going from one conveyor assembly to the next may negatively affect the properties of the conveyed item.

FIG. 2 shows a conveyor assembly system which fluid is used to assist the transition from a first conveyor assembly 200. Fluid streams 205 are applied at the output end of a conveyor assembly 200. The one or more fluid streams 205 are provided at the output end of the conveyor assembly at or near a point at which the conveyor belt deviates from the direction of travel from the input end to the output end. In the arrangement in FIG. 2 this is as the conveyor belt passes over a "lip", or immovable nosebar 140. The belt 130 slides over the nosebar 140 and the tension of the continuous belt means that the outer surface of the nose bar determines the path of the belt 130. The one or more fluid streams 205 are arranged to provide a lifting force to the underside of the conveyed item 150 as the surface of the conveyor belt 130 passes over the nosebar 140.

The lifting force is provided to the part of the conveyed item in contact with the conveyor belt so as to counteract, or to overcome a force on the conveyed item. This may be the force of gravity, adhesion to the conveyor belt surface, or mechanical compression into the conveyor belt surface due to previously applied forces (e.g. cutting). The fluid streams may therefore lift the item upwards against the force of gravity from the belt, or the fluid streams may be directed to simply mitigate or act against the force of gravity as the conveyed item passes over the output end, so as to alter its trajectory from that where no lifting force was applied. As such, where the fluid streams are applied at the output end of a conveyor assembly, they may be arranged to minimise a deviation from the trajectory prior to passing over the output end. Put another way, a conveyed item may be conveyed from one assembly to a receiving assembly (of any kind) with substantially no deviation in its trajectory from the trajectory on the first assembly.

Various general example arrangements for the provision of fluid streams to a conveyed item 150 will now be described which apply to arrangements described herein. One or more fluid streams 205 may be provided continuously at a point at which a conveyed item 150 is to be transferred from a belt. One or more fluid streams 205 may be arranged to pass through perforations present on the conveyor belt 130. The one or more fluid streams 205 may be employed with variable velocities so as to provide a different lifting force at different points along the modified trajectory of the conveyed item 150. The one or more fluid streams 205 may be arranged to be actuated sequentially as the conveyed item 150 passes over them.

A conveyor belt 130 that is not perforated may be employed. In this case, one or more high pressure fluid streams 205 may be applied to the underside of the conveyor belt 130 as the conveyed item 150 passes over the fluid stream location so as to provide an impulse to the underside of conveyed item 150 such that it deviates from the standard trajectory in the direction of travel from the input end to the output end. This would effectively jolt or bump the conveyor belt 130 from the underside, to jump an item from the conveyor belt 130.

Conveyor assemblies such as those described herein may be provided with known sensors for determining the position and velocity of conveyed items 150 on a conveyor belt, and these senses may provide signals to a conveyor control unit (not shown in the figures) which may be arranged to provide the fluid streams when a conveyed item is in the correct location.

Where a conveyed item is to be passed to a receiving conveyor assembly 100b, the one or more fluid streams 205 effectively lift the conveyed item from the conveyor belt so as to provide it with a trajectory which is modified from that of a projectile that is falling under gravity. The modified trajectory may be arranged such that the conveyed item 150 arrive at a receiving conveyor assembly 201 at a point on the receiving belt 135 where the direction of motion of the receiving belt substantially the same as the motion of the conveyed item, as shown in FIG. 2.

FIGS. 3a to 3c show a cross-section of a conveyor roller assembly according to the present disclosure. FIGS. 3(a), (b) and (c) show the conveyor roller assembly at three different positions. A roller assembly 320 comprises an inner axle 321, and an outer axle 325. Inner axle 321 comprises a fluid cavity 322, and a fluid cavity outlet 323. Fluid cavity outlet 323 is located on an outer face of the inner axle 321. Outer axle 325 comprises a plurality of fluid channels 326. Outer axle 325 is arranged to rotate with respect to inner axle 321. Fluid cavity 322 may comprise a pressurised fluid, and when one or more of fluid channels 326 is opposite the fluid cavity outlet 323 a path is formed such that pressurised fluid from the fluid cavity 322 may pass through the fluid channels 326 to form one or more fluid streams 327. Herein the term "axle" may refer to a rotating or non-rotating part of a roller assembly which directly or indirectly contacts a conveyor belt of a conveyor assembly. The roller assembly may be part a drive or driven pulley of the conveyor assembly. The roller or axle, or pulley may be direct or belt driven to provide motion to a conveyor belt.

In FIG. 3(a), it can be seen that two fluid channels 326 are in communication with the fluid cavity outlet 323, and as such two fluid streams 327 are present. Fluid streams 327 are directed outwards from the fluid from the conveyor roller 320 in a generally radial direction. In FIG. 3(b), it can be seen that only one fluid channel is in communication with the fluid cavity outlet, while in FIG. 3(c) two fluid channels are in communication with the fluid cavity outlet. It can be seen that the range of angles at which the fluid streams 327 may be output is a function of the number of fluid channels in the outer axle 325 and the circumferential length of the fluid cavity outlet around the outer surface of the inner axle. It is desirable to arrange the fluid cavity outlet 323 and fluid channels 326 such that at least one channel 326 is in communication with the fluid cavity outlet at any rotational position of the outer axle 325. The fluid cavity outlet 323 is located on a portion of the circumferential surface of the inner axle 321.

The fluid channels 326 are shown in the figures as extending radially through the outer axle 325. Various other shapes may be employed to adjust the direction of the fluid stream emanating from the fluid channels. If the channels are radial then the fluid streams are directed perpendicular to an object resting on a conveyor belt 130 that is passing over the roller assembly. Therefore, the channels may be adjusted to direct fluid streams at any oblique angle to an object so as to provide a force to an object that is approaching the roller assembly, or to an object that has passed over the roller assembly. Where the fluid stream are directed at any angle other than in the radial direction, they will provide a torque to the roller assembly, as in the case of an aeolipile. This torque force is a turning moment provided to the roller assembly to turn about its longitudinal axis and can be used to provide a drive force to the conveyor assembly.

The inner axle 321 may be fixed with respect to a conveyor assembly in which the roller assembly is installed. In this way the fluid cavity outlet is in a fixed position with respect to the conveyor belt and the direction of travel. This in turn means that the range of angles over which the fluid streams are produced is determined by the orientation of the fluid cavity outlet 323. Alternatively, the inner axle 321 may be controllably rotated with respect to the conveyor assembly so as to provide a further controllable range of angles over which the fluid streams may be directed.

Figure 4A:
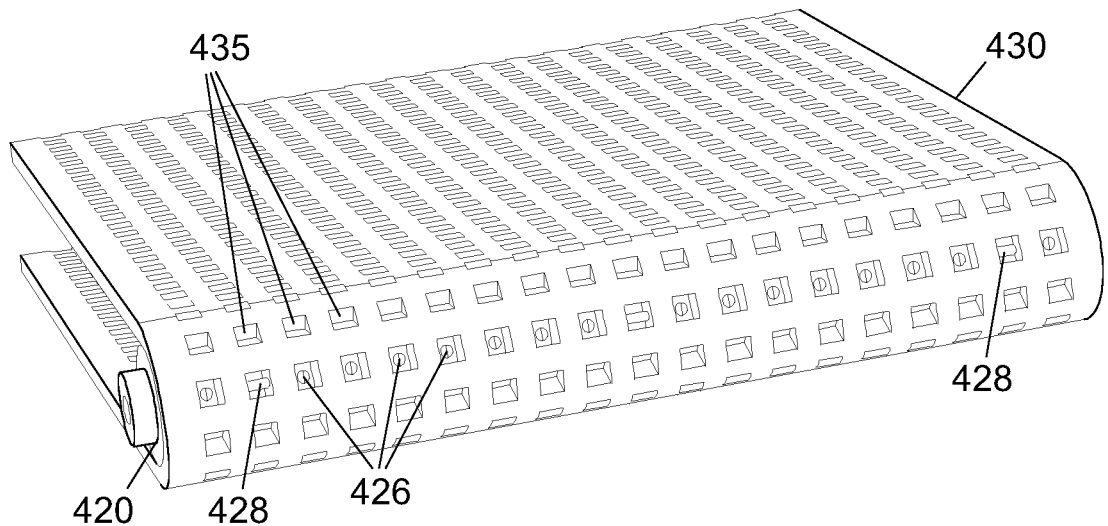
FIG. 4a shows a perspective cut-away of a conveyor assembly according to the present disclosure.

FIG. 4a shows a perspective cut-away view of a conveyor assembly employing a roller of the type shown in FIGS. 3a to 3c. A conveyor assembly comprises a conveyor 430 which comprises a plurality of holes 435 which extend across the width of the conveyor. The conveyor belt 430 travels an "upper" path in the direction of travel, rotates about the conveyor roller 420 and passes back towards an input end in a direction opposite the direction of travel of the item to be conveyed on the belt.

Figure 4B:
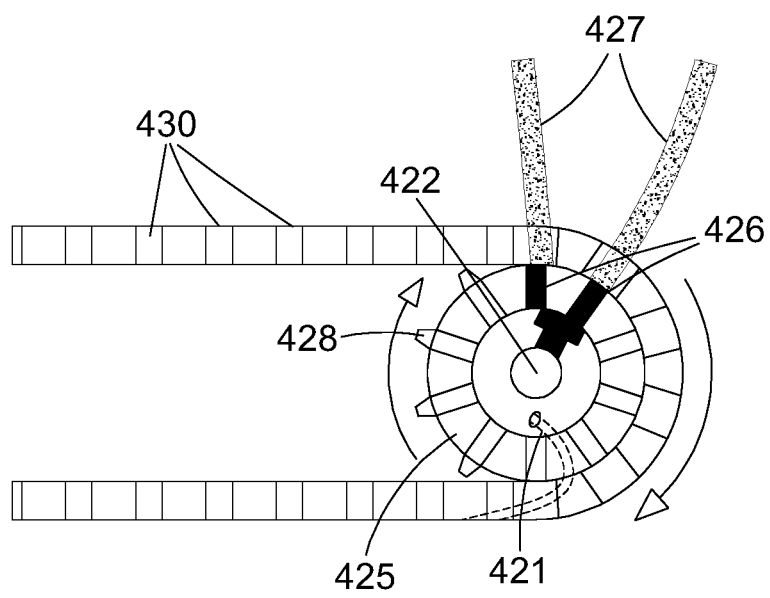
FIG. 4b shows a cross-section of an output end of a conveyor assembly according to the present disclosure.

The conveyor roller 420, which may be any of a driven pulley, a driving pulley, or other roller assembly, comprises gear sprockets 428. Sprockets 428 are arranged on the surface of the roller 420 such that the roller 420 rotates at the same speed as the conveyor belt 430, since the gear sprockets are arranged to align with a series of perforations 435 in the conveyor belt 430. The sprockets may provide a drive force to the conveyor belt if the roller is a driving pulley, or the conveyor belt may rotate the conveyor roller via the sprockets, where the conveyor roller is a driven pulley. The fluid channels 426 of the roller 420 are also arranged in such a way as to align with the holes of the conveyor belt 430 as the conveyor roller rotates with the belt such that fluid streams 427 may pass from the output of the fluid channels through the holes in the conveyor 430, to act on a conveyed object. In the arrangements shown in FIGS. 4(a) and 4(b), the fluid streams 427 are arranged such that they are provided between an angle that is perpendicular to a direction of travel of a conveyed item and an angle that is substantially parallel to the direction of travel. As mentioned above by increasing the circumferential area of the fluid cavity output surface, fluid streams 427 may be provided at any angle. A preferential system may include fluid streams directed from up to 45 degrees against the direction of travel to parallel to the direction of travel.

Figure 5A:
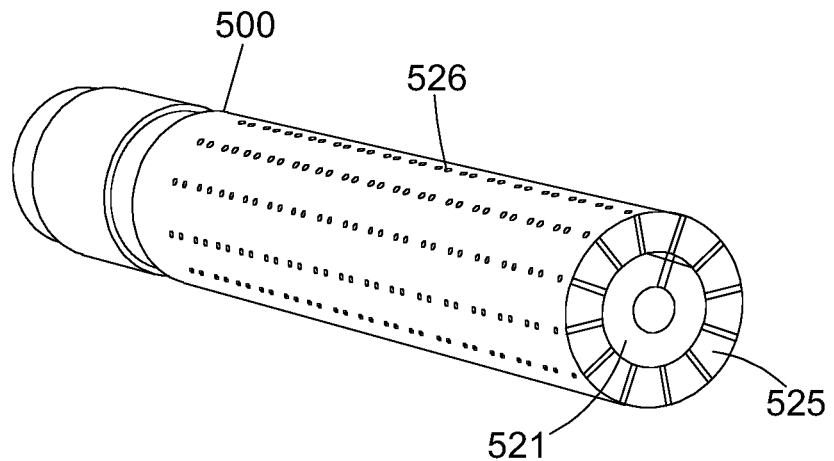
FIG. 5a shows a perspective view of a conveyor roller according to the present disclosure.
Figure 5B:
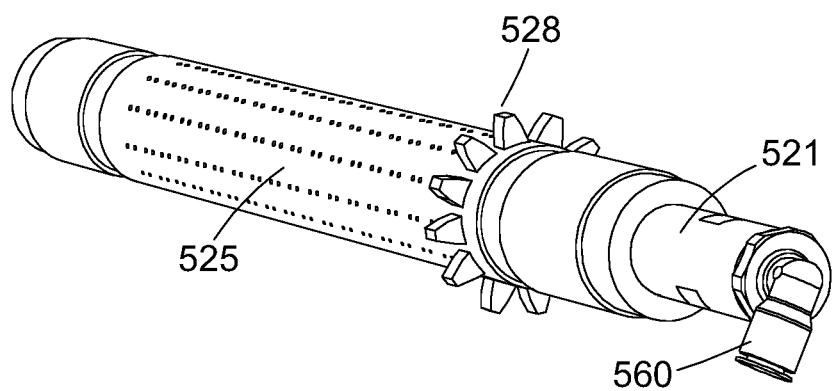
FIG. 5b shows a perspective view of a conveyor roller according to the present disclosure.

FIGS. 5(a) and 5(b) show a perspective view of a roller assembly according to the present disclosure. The roller assembly 500 comprises an inner axle 521 and an outer axle 525 arranged to rotate with respect to the inner axle 521. The outer axle comprises the perforations 526 which are arranged in rows along a longitudinal axis of the roller 500. As can be seen in FIG. 5(b), the outer axle 525 may be provided with gear sprockets 528 which are arranged to cooperate with perforations located in a conveyor belt which is arranged to rotate about the roller 500. Inner axle 521 may be attached to a fluid input assembly hose 560.

As can be seen from the arrangement shown in FIGS. 3, 4 and 5, it will be appreciated that the as the fluid channels rotate with respect to the inner axle, they are either in a first position in communication with the fluid cavity outlet, or a second position in which they are not in communication with the fluid channel outlet. As the fluid channels rotate across the fluid cavity outlet surface from the second position to the first position, and from the first position to the second position, effectively turning the fluid streams "on" and "off" respectively, a variable width of the fluid channel will be in communication with the fluid cavity outlet surface. This means that as it turns "on" and "off" a fluid stream 327 will vary between a zero or low fluid velocity and a full fluid velocity at the point at which the full width of the fluid channel is in communication with the fluid cavity outlet. It will be appreciated that the fluid cavity outlet and fluid channels can be designed in such a way so as to prolong the time in which it takes to go from zero to full flow. The depth and shape of the fluid cavity outlet 323 may be varied. For example, this could be formed by providing multiple fluid cavity outlets of varying diameters (see FIG. 10). Alternatively, this could be achieved by drop-shaped orifices in the surface of the inner axle (see FIG. 11). When combined with a slanting orifice of the channels in the outer axle, a time-dependent area overlap of the openings in the inner and outer axles, and therefore a time-varying flow rate of the fluid streams can be varied.

Figure 6A:
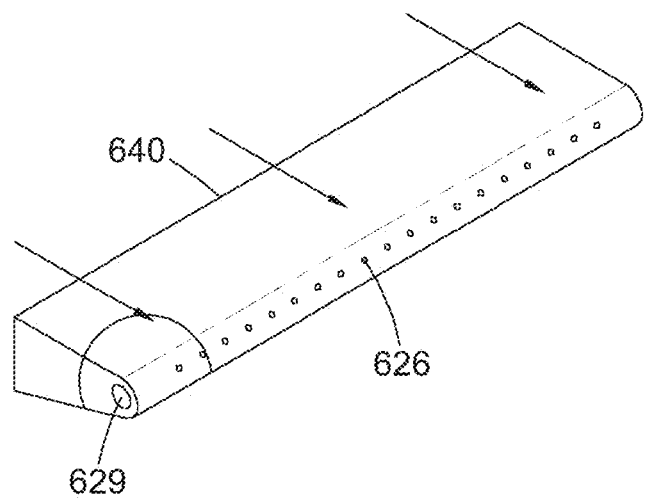
FIG. 6a shows a perspective cut-away of a static nosebar which may form part of a conveyor assembly.
Figure 6B:
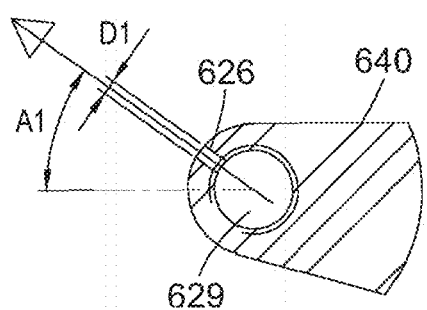
FIG. 6b shows a cross-section through a static nosebar which may form part of a conveyor assembly.

FIG. 6(a) shows a perspective view of a static nosebar in accordance with the present disclosure. Static nosebar 640 comprises a curved end surface over which a conveyor belt [not shown] is designed to pass in the direction of the arrows shown. The curved end surface comprises a number of apertures 626 which connect to an inner fluid cavity 629 via fluid channels. As can be seen from FIG. 6(b), fluid channels 626 of a diameter D1 may be arranged at an angle to horizontal A1. In order to provide a lifting force to a conveyed object against the force of gravity angle A1 should be between zero and 90 degrees. As mentioned above, pressurised fluid may be provided into the cavity 629 such that it travels through fluid channels 626 to provide a lifting force to the underside of a conveyed object. A conveyor assembly comprising the static nosebar shown in FIGS. 6(a) and 6(b) may comprise sensing means arranged to detect when a conveyed item is approaching the static nosebar 640. A conveyor assembly may be arranged to vary a pressure of output streams so as to provide the correct amount of lifting force to the conveyed item as it passes over the nosebar 640.

Figure 7A:
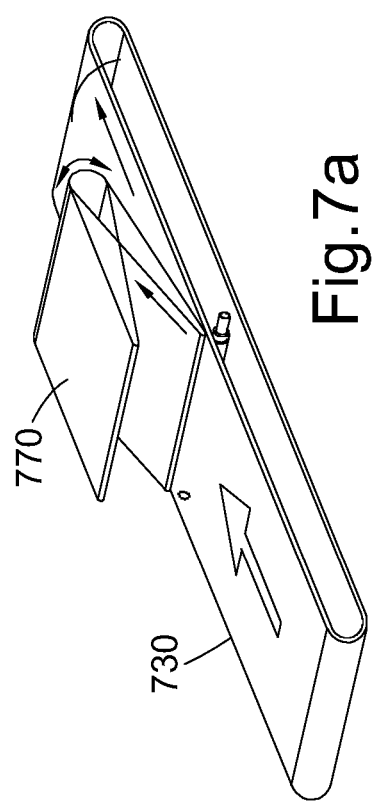
FIG. 7a shows a perspective of a conveyor assembly according to the present disclosure.
Figure 7C:
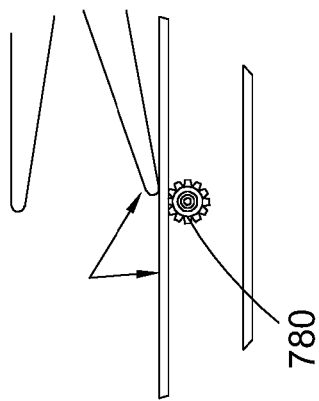
FIG. 7c shows a detail of the conveyor assembly shown in FIG. 7b.
Figure 7B:
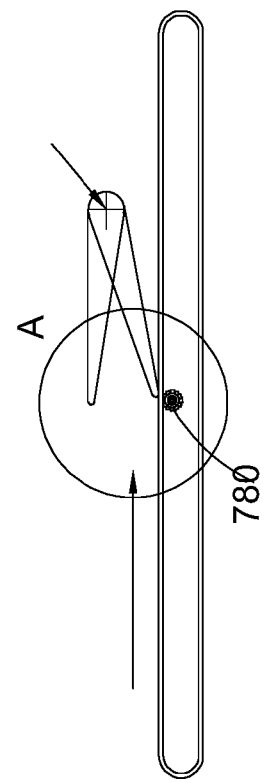
FIG. 7b shows a cross-section of a conveyor assembly according to the present disclosure.

The principle of the present disclosure may be applied to a conveyor assembly such as that shown in FIGS. 7(a), 7(b) and 7(c). Conveyor assembly 700 comprises a flip assembly 770 which has a fixed end and a movable end. The movable end of the flip assembly 770 is rotatable about a fixed axis from a first position in which it is not in communication with the conveyor belt 730 of conveyor assembly 700 from a second position in which it is arranged to be proximal to the conveyor belt 730. When the flip assembly 770 is in the second position, an item being conveyed along the conveyor belt 730 will be transferred from conveyor belt 730 onto a rotating belt of flip assembly 770.

The conveyor assembly may be provided with a conveyor roller 780 at the located underneath conveyor belt 730 at the location at which the movable end of the flip assembly 770 meets the belt 730. The conveyor roller 780 may be a conveyor roller such as those shown in FIGS. 3, 4 and 5. Conveyor roller 780 is therefore arranged to provide a lifting force to an object being conveyed upon conveyor belt 730 so as to transfer it from conveyor belt 730 to flip assembly 770. The lifting force applied to the conveyed object causes the conveyed object to deviate from its trajectory in the direction of travel upon the conveyor belt 730. The fluid streams provided from conveyor roller 780 may effectively cause the conveyed item to jump from the conveyor belt 730 to the flip assembly 770.

The fluid streams provided in the arrangements described in the foregoing may comprise any of air, water, a combination of air and water, or a combination of any other gas and liquid suitable for the purpose for which it is applied. The mixture of gas and liquid may be varied depending on the nature of the conveyed item.

An advantage of the provision of fluid streams for the transfer of conveyed items from one conveyor assembly to a further conveyor assembly is that the conveyor assemblies may be arranged along a substantially flat plane. This allows for the straightforward delivery of a product from end to end of a chain of conveyor assemblies. This can assist any human operators who may be required to work on the conveyed items as they are conveyed. The fluid streams which are applied to the underside of the conveyed item may keep the item moving tangential to the top of the conveyor belt in the direction of travel to avoid the dip between two conveyor assemblies and associated tension due to a conveyed item contacting rollers which will be moving in opposite directions.

Figure 8:
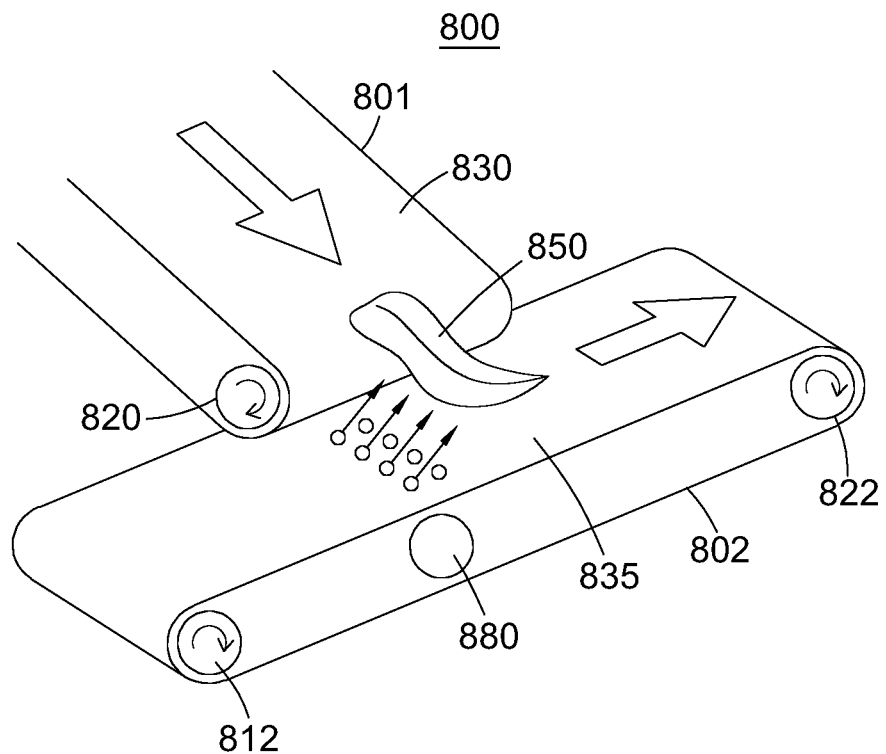
FIG. 8 shows a perspective view of a further conveyer assembly according to the present disclosure.

An alternative conveyor assembly arrangement according to the present disclosure is shown in FIG. 8. In FIG. 8 a conveyor system 800 it can be seen that a fluid protection assembly such as a conveyor roller or axle, or lip assembly according to the embodiments described herein may be provided at an intermediate position on a conveyor assembly 802, so as to provide a cushioning force as an object is received at the conveyor assembly 802. A conveyor system 800 may comprise a first conveyor assembly 801 and a second conveyor assembly 802. The output end of the first conveyor assembly comprises an output roller 820. Second conveyor may comprise an input end roller 812 and an output end roller 822. The conveyor assemblies 801 and 802 are located perpendicular to each other, and the first conveyor assembly 801 is arranged above the conveyor assembly 802 such that an item 850 being conveyed on the conveyor belt 830 of the first conveyor assembly 801 will be delivered to an intermediate location on the conveyor belt 835 of the second conveyor assembly 802. The angle between the respective directions of travel of the first conveyor assembly 801 and 802 may be varied, as can be seen in the alternative arrangement in FIG. 9.

The item 850 being conveyed on conveyor belt 830 reaches the end of the conveyor assembly 801 and will fall under gravity onto the second conveyor assembly 802. Since the directions of travel are different, the instantaneous force which will act on the item 850 as it lands on conveyor belt 835 will not only include the forces of impact but also shear forces if the conveyor belt 832 is in motion at the point of impact. Fluid projection assembly 880 is provided underneath the conveyor belt 835 at or near the location where an item 850 is to be received on the second conveyor assembly 802. The fluid projection assembly 880 is arranged to provide one or more streams of fluid which may act on the item 850 so as to increase the time over which the item 850 must undergo acceleration from the first direction of travel to the second direction of travel. The streams of fluid may be arranged to provide a force which acts against the force of gravity so as to slow the rate of falling of the item 850; the fluid streams may also provide a force that is substantially in the same direction of travel as the direction of travel of the receiving conveyor belt 835. In this way the relative motion between the item 850 and the conveyor belt 835 will be lessened at the point of impact, and so the force transmitted to the item is lessened. In this way a fragile item is less likely to be damaged during transition from the first assembly 801 to the second assembly 802. The streams of fluid cushion the fall of the item.

Figure 9:
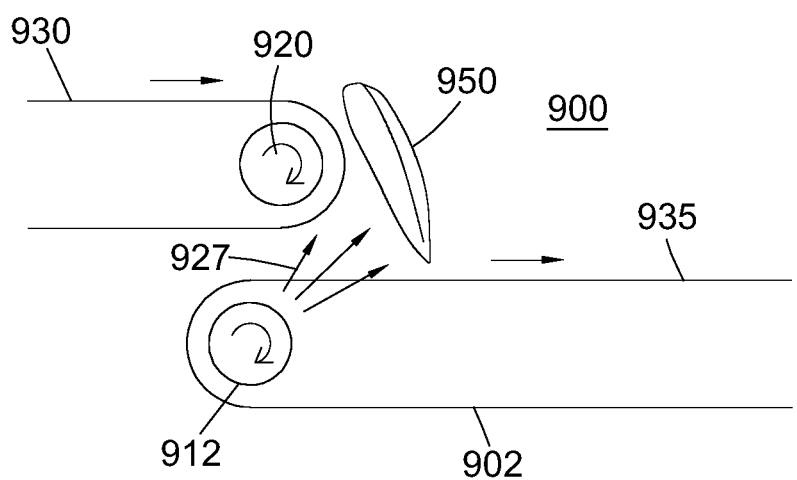
FIG. 9 shows a perspective view of a further assembly according to the present disclosure.

A variant is shown in FIG. 9 in which the direction of travel of a first conveyor belt 930 is substantially similar to the conveyor belt 935 of a second, receiving conveyor assembly 902, but the first and second conveyor assemblies are arranged in different planes, such that an item will travel over the end of an output roller 920 and fall under gravity onto conveyor belt 935. The second conveyor assembly may be provided with a fluid projection mechanism such as the input roller 912 shown in FIG. 9, arranged to provide one or more streams of fluid to a conveyed item 950. In the same way as for the arrangement shown in FIG. 8, the stream(s) of fluid are arranged to lessen the speed of the item 950 as it falls under gravity towards the receiving conveyor belt 935, thus "cushioning" the fall and lessening the vertical impact. The fluid streams are likewise arranged to provide a force in the same direction as the direction of travel of the receiving conveyor belt 935, such that the relative motions of the item 950 and the conveyor belt may be made commensurate prior to the item 950 coming into contact with the conveyor belt 950.

A conveyor belt used in any of the arrangements described above may be provided with holes of differing shapes and sizes to provide different fluid streams to the conveyed object. For example, deflection means might be provided in the centre of the holes or perforations 428 and thereby to create an indirect stream of fluid and a more gentle force to a conveyed object.

One example of a deflection means is that designed to create a film of fluid, as in a "mushroom" jet. A conical or pyramidal member is placed in the path of the fluid stream with the vertex of the member directed against the flow of the fluid stream. The fluid stream may be deflected by the lateral sides of the member such as to produce a film of fluid. Such a film may be useful where a conveyed item is particularly fragile, since the force transferred from the fluid to the item can be spread over a larger area.

Figure 10:
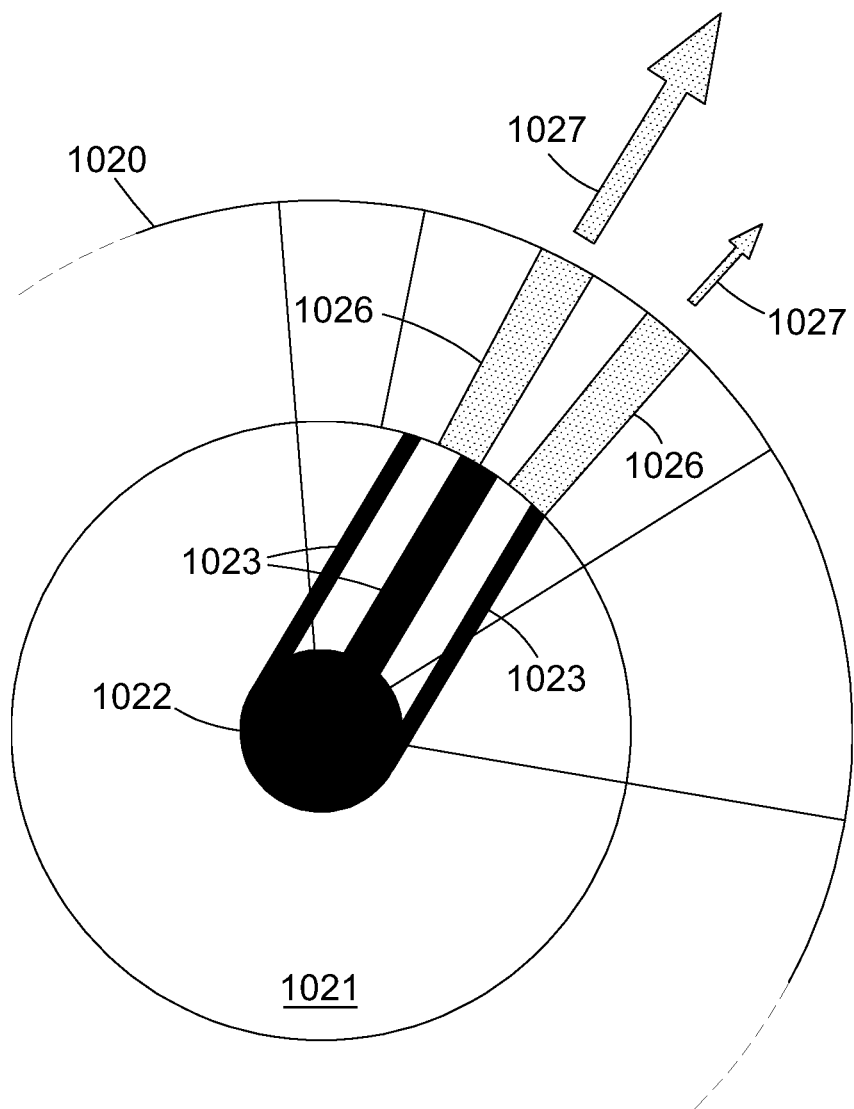
FIG. 10 shows a cross section arrangement of a fluid channel and fluid cavity outlet according to the present disclosure.

FIG. 10 shows an arrangement for a conveyor roller assembly 1020. The roller assembly comprises a plurality of fluid cavity outlets 1023, and the fluid cavity outlets may be arranged with different widths. In this way a fluid channel 1026 may come into communication with a first fluid cavity outlet having a narrow width or aperture and produce a first fluid stream 1027, and subsequently come into communication with a second fluid cavity outlet 1023 having a different width or aperture so as to provide a second fluid stream 1027. The first and second fluid streams can be arranged through the selection of aperture size of the fluid cavity outlet and fluid channel aperture to deliver different forces. A first stream 1027 in communication with a large aperture fluid cavity outlet may provide a high fluid flow and therefore a larger force than a second fluid stream in communication with a narrow aperture fluid cavity outlet.

The fluid channels arranged to provide the fluid jets may further comprise a nozzle arranged to control the properties of the fluid streams. Examples of such nozzles may be spray, flat or angled nozzle. The nozzle may be arranged to provide a jet, a flat stream, a cone, or a diffuse mist.

Figure 11:
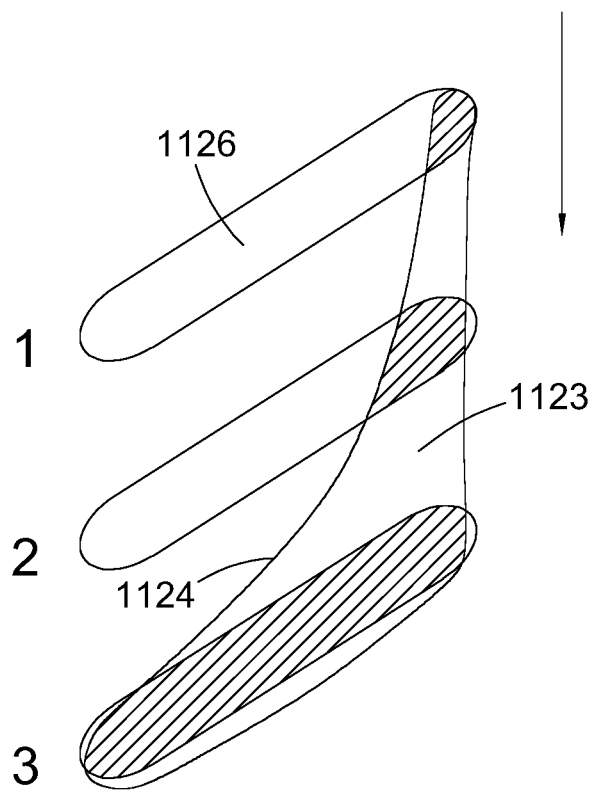
FIG. 11 shows a detail of an arrangement of a fluid channel and fluid cavity outlet according to the present disclosure.

FIG. 11 shows a sectional view of an arrangement of apertures for use with the conveyor roller assemblies described in the foregoing. An inner axle of a roller assembly may comprise a fluid cavity outlet 1123 having a non-uniform width. The fluid cavity outlet 1123 is arranged on an outer surface of an inner axle such that a fluid channel 1126 located on a rotating outer axle is in communication with it as the outer axle rotates in the direction of the arrow shown. At a first position (1) the fluid channel 1126 is in communication with an end portion of the fluid cavity outlet 1123, and fluid will flow from an area shown in the shaded portion. At position (2) it can be seen that the fluid channel 1126 has rotated such that a larger area is in fluid communication with the fluid cavity outlet 1123. At position (3), the full area of fluid channel 1126 is in communication with fluid cavity outlet 1123, and has therefore reached a full capacity fluid flow through the fluid channel. The rate of change of flow is this determined by the shape of a side wall 1124 of the fluid cavity outlet 1123.

A further advantage of providing the fluid streams on a conveyor roller or movable axle is that the fluid streams rotate at the speed of the conveyor belt and therefore also add the speed of the conveyed item such that a fluid stream will act upon the same location of the conveyed item and not move across the surface of the item, as the embodiment shown in FIG. 6(a).

The claims are not limited to particular embodiments set out in the description, and the skilled person will appreciate that multiple modifications or additions may be made to the specific embodiments described herein, without departing from the scope of the claims. Those skilled in the art will recognize that a wide variety of modifications, alterations, and combinations can be made with respect to the above described embodiments without departing from the scope of the disclosed concepts, and that such modifications, alterations, and combinations are to be viewed as being within the ambit of the disclosed concepts.

The invention claimed is:

1. A conveyor system, comprising:
a first conveyor assembly having:
an input end;
an output end, and
a conveyor belt arranged to convey an object from the input end toward the output end in a direction of travel, wherein the conveyor system comprises a fluid projection mechanism, the fluid projection mechanism being arranged to provide a fluid suitable for providing a lifting force to a conveyed object as the conveyed object passes over the fluid projection mechanism; and
wherein the conveyor system further comprises a conveyor roller, the conveyor roller comprising:
a body having a rolling surface between a first end and a second end;
a fluid cavity located within the body, the fluid cavity having a fluid cavity outlet, and
a plurality of fluid channels distributed about a circumference of the conveyor roller and arranged to connect the fluid cavity with the rolling surface, the fluid cavity outlet being configured to communicate with at least two of the fluid channels simultaneously to provide at least two fluid streams from the rolling surface.

2. The conveyor system of claim 1, wherein the fluid projection mechanism is arranged to provide the fluid at an angle between a first angle perpendicular to the direction of travel and a second angle parallel to the direction of travel.

3. A conveyor system according to claim 1, wherein the conveyor belt is permeable, such that the stream of fluid can pass from the rolling surface through the conveyor belt.

4. A conveyor system according to claim 1, wherein the conveyor belt comprises a plurality of perforations, and wherein the plurality of fluid channels are arranged such that the plurality of fluid channels are configured to align with the perforations such that the plurality of fluid streams pass from the rolling surface through the conveyor belt.

5. A conveyor system according to claim 1, wherein the roller body comprises:
an inner axle, and
an outer axle, and wherein the plurality of fluid channels is located in the outer axle;
the fluid cavity is located in the inner axle, the fluid cavity outlet being located on an outer face of the inner axle, and
the outer axle is rotatable about the longitudinal axis with respect to the inner axle such that the plurality of fluid channels cyclically move from a first position in communication with the fluid cavity outlet to a second position not in communication with the fluid cavity outlet.

6. A conveyor system according to claim 1, further comprising a lip assembly, the conveyor belt being arranged to pass over the lip assembly, wherein the fluid projection mechanism is located at the lip assembly, and arranged to provide the fluid as the conveyed object passes over the lip assembly.

7. A conveyor system according to claim 6, wherein the lip assembly comprises:
a body having a conveying surface,
a fluid cavity located within the body, and
a fluid channel arranged to connect the fluid cavity with the conveying surface, the fluid channel being arranged such that a pressurised fluid in the fluid cavity may pass through the fluid channel to provide the fluid for providing a lifting force to the conveyed object from the conveying surface.

8. A conveyor system according to claim 7, wherein the lip assembly comprises a plurality of fluid channels arranged to provide a plurality of streams of fluid for providing the lifting force to the conveyed object.

9. A conveyor system according to claim 1, wherein the fluid projection mechanism is located at the output end of the conveyor assembly, and arranged to provide the fluid as the conveyed object passes over the output end.

10. A conveyor system according to claim 1, wherein the fluid comprises one of:
air;
water, and
a mixture of air and water.

11. A conveyor roller for a conveyor assembly, comprising:
a body having a rolling surface between a first end and a second end;
a fluid cavity located within the body, the fluid cavity having a fluid cavity outlet;
a plurality of fluid channels distributed about a circumference of the conveyor roller and arranged to connect the fluid cavity with the rolling surface, the fluid cavity outlet being configured to communicate with at least two of the fluid channels simultaneously to provide at least two fluid streams which exit the body through the rolling surface for directing at a conveyor belt of the conveyor assembly.

12. A roller according to claim 11, wherein:
the body comprises an inner axle and an outer axle,
the fluid channels are located in the outer axle;
the fluid cavity is located in the inner axle, the fluid cavity outlet being located on an outer face of the inner axle, wherein
the outer axle is rotatable about the longitudinal axis with respect to the inner axle such that each fluid channel cyclically moves from a first position in communication with the fluid cavity outlet to in a second position not in communication with the fluid cavity outlet.

13. A roller according to claim 12, wherein the first position occupies an angular range perpendicular to the longitudinal axis between a first angle and second angle, wherein the first angle is perpendicular to a direction of travel of a conveyor belt the roller and the second angle is parallel to the direction of travel of a conveyor belt.

14. A roller according to claim 11, wherein the body is cylindrical, the body being arranged to rotate about a longitudinal axis, and the fluid channels are arranged perpendicular to the longitudinal axis.

15. A roller according to claim 14, wherein the inner axle is fixed to prevent rotation about the longitudinal axis.

16. A roller according to claim 11, wherein the fluid comprises one of:
air;
water, and
a mixture of air and water.

17. A method of conveying an object from a first conveyor assembly, the conveyor assembly having an input end and an output end and comprising a conveyor belt arranged to convey an object in a direction of travel from the input end towards the output end, wherein the conveyor assembly comprises a conveyor roller assembly, the conveyor roller assembly comprising:
a body having a rolling surface between a first end and a second end;
a fluid cavity located within the body, the fluid cavity having a fluid cavity outlet, and
a plurality of fluid channels distributed about a circumference of the conveyor roller and arranged to connect the fluid cavity with the rolling surface, the fluid cavity outlet being configured to communicate with at least two of the fluid channels simultaneously to provide at least two fluid streams from the rolling surface, the method comprising:
conveying an object on the conveyor belt;
providing, on the conveyor roller assembly, a fluid projection mechanism arranged to project the fluid, and
directing the fluid to provide a lifting force to the conveyed object as the conveyed object passes over the fluid projection mechanism to lift the object from the conveyor belt.

18. A method according to claim 17, wherein directing the fluid comprises directing the fluid at an under-side of the object.

19. A method according to claim 17, wherein the fluid is directed in a direction upwards against gravity.

20. A method according to claim 17, wherein the conveyor assembly comprises a lip assembly, the conveyor belt arranged to pass over the lip assembly, the method further comprising:
providing the one or more fluid projection mechanisms on the lip assembly, and
providing the lifting force is done so as to lift the object from the conveyor belt as it passes over the lip assembly.

21. A method according to claim 17, further comprising:
providing the fluid comprises providing a fluid stream directed in an angular range between a first angle perpendicular to the direction of travel and a second angle in the direction of travel.

22. A method according to claim 17, wherein the fluid comprises one of:
air;
water, and
a mixture of air and water.

* * * * *